United States Patent [19]

Woodson

[11] Patent Number: 4,761,441

[45] Date of Patent: Aug. 2, 1988

[54] ACID-CURABLE COMPOSITIONS COMPRISING MIXTURES OF FURAN AND EPOXY RESINS AND USE IN PREPARING FORMED, SHAPED, FILLED BODIES

[75] Inventor: Wayne D. Woodson, Danville, Ill.

[73] Assignee: CL Industries, Inc., Georgetown, Ill.

[21] Appl. No.: 750,891

[22] Filed: Jul. 1, 1985

[51] Int. Cl.$^4$ .......................... C08K 3/36; C08L 71/06; C08L 63/00; C08L 45/00

[52] U.S. Cl. .................................... 523/439; 523/466; 523/467; 523/144; 525/117; 525/410; 525/414

[58] Field of Search ............... 523/144, 439, 466, 467; 525/117, 410, 414

[56] References Cited

U.S. PATENT DOCUMENTS

| | | | |
|---|---|---|---|
| 2,839,481 | 6/1958 | Harvey | 525/522 |
| 3,268,466 | 8/1966 | Simm | 523/144 |
| 3,404,118 | 10/1968 | Guyer | 523/144 |
| 3,734,936 | 5/1973 | Brown | 523/144 |
| 3,745,139 | 7/1973 | Kachur | 523/144 |
| 3,879,339 | 4/1975 | Richard | 260/38 |
| 4,176,114 | 11/1979 | Stewart et al. | 260/42.29 |
| 4,185,002 | 1/1980 | Nakamura | 523/439 |
| 4,215,206 | 7/1980 | Hanesworth et al. | 525/441 |
| 4,254,245 | 3/1981 | Madaliev | 525/410 |
| 4,439,348 | 3/1984 | Akerberg | 523/144 |
| 4,451,577 | 5/1984 | Coss | 502/167 |
| 4,482,653 | 11/1984 | Gruber | 523/144 |
| 4,483,961 | 11/1984 | Koch | 523/144 |
| 4,518,723 | 5/1985 | Woodson | 523/466 |

FOREIGN PATENT DOCUMENTS 0102208 3/1984 European Pat. Off. .

Primary Examiner—C. Warren Ivy
Attorney, Agent, or Firm—Renner, Otto, Boisselle & Sklar

[57] ABSTRACT

Acid-curable resin compositions are described which comprise a mixture of a furan resin and a minor amount of an acid-curable epoxy resin. The acid-curable resin compositions may contain other components such as catalysts, solid particulate materials, etc. The procedures for curing such acid-curable resin compositions as well as methods for forming shaped, filled bodies such as sand cores and molds also are described. Sand cores and molds produced in accordance with the method of the invention exhibit good compression strength, good chemical resistance and increase resistance to stress cracking.

23 Claims, No Drawings

ACID-CURABLE COMPOSITIONS COMPRISING MIXTURES OF FURAN AND EPOXY RESINS AND USE IN PREPARING FORMED, SHAPED, FILLED BODIES

BACKGROUND OF THE INVENTION

This invention relates to new and useful acidcurable resin compositions which comprise a mixture of furan resin and a minor amount of an epoxy resin. These curable resin compositions are useful particularly in preparing formed, shaped, filled bodies which comprise the acid-curable resin composition and inorganic solid particulates. Particularly useful filled bodies of this type include foundry cores and molds.

Furan resins and furan polymers are terms often used interchangeably referring to thermosetting resins which are obtained primarily by condensation polymerization of furfuryl alcohol or furfuryl aldehyde in the presence of strong acids. The term also generally includes resins made by condensing phenol with furfuryl alcohol or furfuryl polymers or furfuryl-ketone polymers. Examples of furan resins include furfural-phenol resins, furfuryl alcohol resins, furfuryl-acetone resins, furfuryl alcohol-formaldehyde resins, etc.

Generally, the curing of furan resins can be accomplished by the addition of either mineral or organic acids with the rate of cure primarily dependent upon temperature and the activity and concentration of the acid catalyst. Strong catalysts such as sulfuric acid or para-toluene sulfonic acid can effect rapidcures at about room temperature with an exothermic reaction to a peak temperature of about 90° to 100° C.

Furan resins have been used as binders in foundry applications, grinding wheels, fiberglass reinforced plastic laminated equipment, and for coated abrasives and polymer concrete. In many of these applications, it is desirable to be able to work with the binder system in the uncured, fluid state for an extended period of time prior to reaching the cured or unworkable state.

Furan-based binders are desirable in foundry applications, and particularly in core production. After pouring of the molten metal over the core or mold, sand shapes prepared utilizing furan-base binders rapidly deteriorate and result in an easy "shake-out".

It also is desirable to provide curable foundry binder systems which are exothermic and which may be triggered by relatively low levels of heat input. The foundry industry continues to seek binder systems and methods for rapidly producing foundry cores and molds which are of high quality and which exhibit high tensile strengths, good chemical resistance and increased resistance to stress cracking. The utility of furan resins as binders and foundry applications is illustrated in U.S. Pat. Nos. 4,439,348; 4,451,577; 3,879,339; etc.

Modified furan binder systems comprising mixtures of furan resins with other resins also have been described. U.S. Pat. No. 4,176,114 describes the formation of sand cores or molds from sand and condensation-type resins comprising a high viscosity of polyfurfuryl alcohol or mixtures of polyfurfuryl alcohol with a phenol-formaldehyde, urea-formaldehyde, or phenol-urea-formaldehyde precondensate resin, or a condensate of polyfurfuryl alcohol with a phenolformaldehyde, urea-formaldehyde, or phenol-urea-formaldehyde precondensate resin. Curing of the resin system is effected by acid catalysts such as sulfuric acid formed in situ.

Modification of the properties of furan resins as binders in foundry applications also is described in U.S. Pat. No. 4,215,206. Furan resins are modified by incorporating an aromatic polyester polyol derived from polycarbomethoxy-substituted diphenyl, polyphenyl and benzyl esters of the toluate family. This combination is reported to provide the furan binders with a significant increase in core strength.

The so-called "epoxy" resins have been utilized as binders and adhesives in a number of applications. Epoxy resins are characterized by the presence of an epoxide group, i.e.,

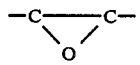

Epoxy resins are available commercially from a wide variety of sources, and the commercially available products, depending upon the chemical make-up of the epoxy resin, are characterized by a variety of properties.

Although furan resins have been utilized extensively as binders in foundry applications, it generally has been observed that the structures prepared utilizing such furan binders are typically very hard and brittle with poor elongation, and the cured structures are subject to stress cracking. Furan binders and various aggregates have been used in construction of chemical resistant floors, tanks, curbings and related structures, but persistant stress cracking problems and difficulties in application have prevented their widespread use.

SUMMARY OF THE INVENTION

The present invention relates to new and useful acid-curable resin compositions comprising a mixture of a furan resin and a minor amount of an epoxy resin. The invention also relates to methods of curing said acid-curable resins utilizing acid catalysts, and to the use of such curable epoxy resins in the preparation of formed, shaped, filled bodies. The acid-curable resin compositions of the present invention have been found to be useful particularly in the formation of floors, curbing, pump bases and related structures characterized by improved compression strength, resistance to stress cracking, and superior chemical resistance in comparison to conventional concrete, epoxy, polyester, vinyl ester and other "polymer concrete structures".

DESCRIPTION OF THE PREFERRED EMBODIMENTS

The compositions of this invention are acid-curable resin compositions which comprise a mixture comprising a furan resin and an epoxy resin.

The furan resins suitable for use in accordance with the present invention include those furan-based binders which are liquid or low melting solids which can readily be converted to liquids. Examples of furan resin binders include those binders which are the product of the homopolymerization of furfuryl alcohol or of the homopolymerization of bishydroxymethyl furan. Other binders include furfuryl alcohol-formaldehyde resins, urea-formaldehydefurfuryl alcohol resins and/or a phenol-formaldehydefurfuryl alcohol resin. Another furan-based resin useful in the present invention is a blend of a resinous high polyhydroxymethyl furan condensation product and furfuryl alcohol monomer.

In accordance with the present invention, the acid-curable resin compositions also comprise a minor amount of an acid-curable epoxy resin. The epoxy resins may be any one of a number of well known resins which are acid-curable and which are characterized by the presence therein of at least one epoxide group. As used in the specification and in the appended claims, the term "epoxy resin" is intended to describe the reaction products of the condensation reaction of an epihalohydrin and a hydroxy-containing compound or carboxylic acid, thus the epoxy resins may be of the ether or ester types although the ether type epoxy resins are preferred.

Examples of ester-type epoxy resins include polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Ether-type epoxy resins are obtained by reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions instead of being single simple compounds are generally complex mixtures of glycidyl polyethers. Generally, however, the principal product may be represented by the formula

wherein n is an integer of from 0 to 3, and R represents the divalent hydrocarbon group of a polyhydroxy compound which may be an aliphatic or aromatic polyhydroxy compound. These ethers may be made from acyclic alcohols such as ethylene glycol, diethylene glycol, and higher poly(oxyethylene) glycols, propane-1,2-diol and poly(oxypropylene) glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, and 2,2-bis(4-hydroxycyclohexyl) propane, and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane (otherwise known as bisphenol F), 4,4'-dihydroxydiphenyl, bis(4-hydroxyphenyl) sulphone, 1,1,2,2-tetrakis(4-hydroxyphenyl) ethane, 2,2-bis(4-hydroxyphenyl)propane, (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenol itself, and phenol substituted in the ring by chlorine atoms or by alkyl groups each containing up to 9 carbon atoms, such as 4-chlorophenol, 2-methylphenol, and 4-tert-butylphenol.

The value of n is determined by the relative concentration of epichlorohydrin reactant to the polyhydroxy compound. The greater the concentration of epichlorohydrin, the lower the value of n. In general, the value of n determines many of the characteristics of the epoxy resin. For example, the resin generally is a liquid at room temperatures for values of n between 0 and about 3 and solid for values of n greater than about 3. The physical properties of the final hardened resin also are determined by the value of n since, as the value of n increases, the amount of cross-linking in the resin is increased resulting in a resin of greater strength and durability.

The epoxy resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic) alkane or a tetrakis-(hydroxy-aromatic) alkane with a halogen-substituted aliphatic epoxide in the presence of a base such as, for example, sodium hydroxide or potassium hydroxide.

The most widely used epoxy resins are diglycidyl ethers of bisphenols, especially bisphenol A. These are made by reacting epichlorohydrin with bisphenol A in the presence of an alkaline catalyst. By controlling the operating conditions and varying the ratio of epichlorohydrin to bisphenol A, products of different molecular weight can be made.

Other usable epoxy resins include the diglycidyl ethers of other bisphenol compounds such as bisphenol B, F, G and H.

Epoxy resins of the type described above based on various bisphenols are available from a wide variety of commercial sources. One group is known by the general trade designation "Epon" resins and are available from Shell Chemical Company. For example, "Epon 820" is an epoxy resin having an average molecular weight of about 380 and is prepared from 2,2-bis(p-hydroxyphenol) propane and epichlorohydrin. Similarly, "Epon 1031" is an epoxy resin having an average molecular weight of about 616 and is prepared from epichlorohydrin and symmetrical tetrakis-(p-hydroxyphenol) ethane. "Epon 828" has a molecular weight of 350–400 and an epoxide equivalent of about 175–210.

Another group of commercially available epoxy resins is identified under the general trade designation EPI-REZ (Celanese Resins, a division of Celanese Coatings Company). For example, EPI-REZ 510 and EPI-REZ 509 are commercial grades of the diglycidyl ether or bisphenol A differing slightly in viscosity and epoxide equivalent.

Another class of epoxy resins useful in the present invention is the epoxidized novolacs, particularly the epoxy cresol and epoxy phenol novolacs. These are produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also can be utilized in the present invention. Epoxy resins having non-benzenoid molecular structures generally are referred to in the art as being aliphatic epoxy resins or cycloaliphatic epoxy resins. Cycloaliphatics can be produced by the peracetic epoxidation of cyclic olefins and by the condensation of an acid such as tetrahydrophthalic with epichlorohydrin, followed by dehydrohalogenation. The aliphatic epoxy resins can be prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin (and others mentioned above) to form liquid epoxy resins characterized by viscosities which are lower than epoxy resins derived from aromatic hydroxy compounds. When cured, such aliphatic epoxy resins are not as brittle as the aromatic epoxy resins, and in many instances, exhibit elastomeric properties. Aliphatic epoxy resins are available commercially from a variety of sources including, for example, Shell Chemical Company and Reichhold Chemicals, Inc. Specific examples include Epon 562 from Shell Chemical Company having a viscosity of 90–150 centipoises at about 23° C., an epoxide equivalent of 140–165, and a hydroxyl equivalent weight of about 65.

The epoxy resins will have an epoxy equivalency greater than 1.0. By epoxy equivalence, reference is made to the average number of 1,2-epoxide groups contained in the average molecule of the glycidyl ether or ester. As a result of the method of preparing the glycidyl polyethers and polyesters, and since they are ordinarily mixtures of chemical compounds having somewhat different molecular weights, the epoxy equivalency of the products is not necessarily the integer 2.0. However, in all cases, the equivalency is generally a value of between 1.0 and 2.0. Epoxidized novolac resins which are useful in the present invention generally are prepared by the reaction of epichlorohydrin with phenol formaldehyde condensates. The epoxidized novolacs may contain more than two epoxy groups per molecule, and epoxidized novolacs having up to 7 to more epoxy groups are available commercially. The use of epoxidized novolacs containing more than two epoxy groups per molecule results in products containing a highly cross-linked structure.

The acid-curable epoxy resins of the present invention can be modified by the addition of various monomers and polymers which effect desirable properties in the cured epoxy system. For example, the thermal stability of the epoxy system can be increased by mixing various monomers with the furan resin-epoxy resin mixture. These mixtures then can be cured in the manner described above.

Examples of monomeric materials which can be blended with the acid-curable resins in accordance with this invention include acrylic or vinyl monomers, furfuryl alcohol, polyfurfuryl alcohol, a formaldehydebased thermosetting resin, urethane resin, or mixtures thereof. The exact mechanism by which these specified monomers and polymers modify the properties of the acid-curable resins is not known at this time. It has been found that up to about 50% by weight of the above-specified monomers and polymers can be mixed with the epoxy resin to form modified epoxy resin systems useful with the furan resins in accordance with the invention. Acrylic compounds are particularly useful as modifiers for the epoxy systems, and specific examples include trimethylol propane triacrylate and furfuryl methacrylate. Examples of the formaldehyde- based thermosetting resins useful as modifiers include phenol-formaldehyde resin or urea formaldehyde resin. Resorcinol also is a particularly useful modifying agent.

As mentioned above, the acid-curable resin compositions of the present invention comprises a furan resin and a minor amount of an epoxy resin. Generally, the composition will contain from about 5 to about 45% by weight based on the weight of the furan resin present in the composition. In a more preferred embodiment, the resin compositions of the invention will contain from about 10 to 25 parts by weight per 100 parts by weight of furan resin.

The acid-curable resin compositions of the present invention may be cured by any of the acid catalysts known in the art for initiating polymerization of thermosetting acid-curable resins. Acid catalysts of such types are generally well known and are described in, for example, U.S. Pat. Nos. 3,008,205; 3,020,609; 3,108,340; 3,145,438; 3,184,814; 3,639,654; and 3,816,375. The acid catalyst may be added to the resin or resin/solid particulate mixture in liquid or gaseous form, or the catalyst may be formed in situ. The acid catalyst may be inorganic acids, organic acids, or salts thereof. Examples of inorganic acids include sulfuric acid, hydrosulfuric acid, hydrochloric acid, phosphoric acid, and Lewis acids such as ferric chloride.

The inorganic acid salts which are normally used in furan binder containing foundry applications are those salts which have sufficient latency to provide an adequate working life to the composition (e.g., a working life of at least about one hour at 70° C.) and which rapidly accelerate the cure of the composition under heated conditions in less than about five minutes. Examples of such catalysts normally used in hot box foundry applications include, for example, ammonium chloride, ammonium sulfate, ammonium nitrate, aluminum chloride, aluminum nitrate, aluminum sulfate, copper chloride, copper nitrate and copper sulfate.

Examples of organic acids which are useful as curing catalysts include the lower aliphatic-substituted and aromatic-substituted sulfonic acids such as, for example, toluene sulfonic acid, benzene sulfonic acid, xylene sulfonic acid, and methane sulfonic acid. Useful salts of such organic acids include aluminum methane sulfonate, aluminum toluene sulfonate, aluminum xylene sulfonate, aluminum phenol sulfonate, copper toluene sulfonate, copper xylene sulfonate, urea-phenol sulfonate, urea-toluene sulfonate, urea-methane sulfonate, urea-xylene sulfonate, iron toluene sulfonate, iron methane sulfonate, etc. Mixtures of acids and acid salts can be utilized as the acid catalyst for curing the acid-curable resin compositions of the invention.

In one preferred embodiment of the present invention the acid catalyst comprises an aromatic sulfonic acid or a mixture comprising an aromatic sulfonic acid and the urea salt of said aromatic sulfonic acid. The urea salt of any particular sulfonic acid may be formed through the addition of urea to an aqueous solution of the sulfonic acid. For example, to prepare a 50% aqueous solution of the urea salt of phenol sulfonic acid, 57 parts of a 65% phenol sulfonic acid solution are added to 30 parts of water and blended. Urea (13 parts) then is added to the diluted acid and further mixed to form the desired salt solution. Salt solutions prepared in this manner can then be blended with the desired amount of the corresponding sulfonic acid to form the desired catalyst mixture.

Mixtures of urea salts and sulfonic acids wherein the ratio of acid:salt is about 1:1 to about 1:10 are useful in the present invention. The preparation of such sulfonic acid:urea salts is described in, for example, U.S. Pat. Nos. 4,439,348 and 4,451,577. The utility of such catalytic system for curing furan polymer concrete mixtures also is described in the U.S. Pat. Nos. 4,459,348 and 4,451,577 patents.

The acid catalysts added to the resin compositions or resin/particulate compositions of the present invention will be an amount sufficient to initiate curing of the thermosetting acid-curable resin. Generally, from about 5 to about 60%, and more preferably 10 to about 30% by weight of the acid catalyst based on the weight of the resin is sufficient to initiate polymerization.

In a preferred embodiment of the invention, acid-curable resin compositions are prepared which comprise a mixture of
(A) a major amount of a solid particulate material, and
(B) a minor amount of an acid-curable resin which comprises
  (i) a furan resin, and
  (ii) from about 5 to about 45 parts, per 100 parts of furan resin, of an acid-curable epoxy resin.

Generally, the amount of epoxy resin utilized will be from about 5 to about 25 parts per 100 parts of furan resin. The amount of acid-curable resin (B) contained in the above compositions generally will be from about 0.2 to about 15% by weight of the resin composition based on the weight of the particulate material. The acid-curable compositions generally will contain from about 15 to about 60%, and more preferably from about 20 to about 30% by weight of the acid catalyst based on the total weight of the furan and epoxy resins. When the process of the invention utilizes a room-temperature curing catalyst, it is added to the other components of the composition as the last ingredient in order to avoid premature curing. If the catalyst is one that is activated at higher temperature, then it may be mixed with the other components in any order so long as the temperature of the mixture does not reach the cure-initiating temperature.

A variety of solid particulate materials can be utilized in the resin compositions of this embodiment. The choice of particulate material will depend, in part, on the intended use of the filled resin. Among the particulate materials which can be used as fillers in the compositions of the invention include all materials containing a high proportion of silica such as siliceous sand, refractory materials, granular metal oxides such as zirconium oxides, and abrasive products such as carborundum, emery, quartz, garnet, aluminum oxide, silicon carbide, etc.

Other materials may be included in the compositions of the invention to provide additional desirable results. For example, coupling agents for improving the bond between the resin composition and the particulate materials and to improve the ability of the composite to return its original properties after prolonged aging and/of exposure to moisture. Examples of coupling agents known in the art include the silanes and titanates. Chemically, the coupling agents are hybrid materials that possess the functionality of an organic reactive group at one end of the molecule and the inorganic alkoxysilane or alkoxytitanate functionality at the other. Typical organo-functional groups found in the silanes include the vinyl, chloroalkyl, epoxy, methacrylate, amine and styrylamine. The silane coupling agents known in the art are particularly useful in the filled composition of the invention.

The compositions of the present invention comprising the solid particulate material, acid-curable resin composition, acid catalyst and other optional additives such as silanes can be formed into various shapes utilizing molds. When the catalyst system utilized in the present invention is one that is activated at about room temperature, it is necessary that the catalyst be the first component added to the mixture, and the mixture containing the catalyst must be placed into the mold shortly after mixing. When the catalyst is one that is initiated at high temperature or initiated by chemical reaction, the mixtures containing such acid catalyst can be placed into the mold, and curing of the mixture can be effected at any desired time by the elevation of the temperature or addition of the chemical required to initiate the reaction.

One of the advantages of utilizing the compositions of the present invention which comprise a mixture of a furan resin and an epoxy resin is that the acid cure of the furan resin is modified by the presence of the epoxy resin. Thus, it is possible by the present invention to design furan resin epoxy resins-silica aggregate systems which have improved working life, lower peak exotherm, good compression strength, good chemical resistance and improved resistance to stress cracking. Moreover, it has been discovered that the epoxy resins behave as reactive plasticizers in the compositions of the present invention which impart greater flexibility to the filled furan structures.

The following examples are illustrative of the invention. Unless otherwise indicated in the examples and elsewhere in this application, all parts and percentages are by weight, and all temperatures are in degrees centigrade.

| Resin Composition | |
|---|---|
| Identification | Parts by Weight |
| Example 1 | |
| Furfuryl alcohol resin | 80 |
| Epon 828 (bisphenol A) | 20 |
| Example 2 | |
| Furfuryl alcohol resin | 68 |
| Phenolic resole | 8.5 |
| Urea formaldehyde resin | 8.5 |
| Epon 828 | 15 |
| Example 3 | |
| Furfuryl alcohol polymer | 80 |
| Epoxidized novolac resin (epoxy ratio 2.8) | 20 |

PREPARATION OF SOLID FILLED SHAPES

EXAMPLE 4

The catalyst utilized in this example comprises 0.6 parts of urea blocked phenolsulfonic acid and 0.6 parts of 65% phenol sulfonic acid in water. The catalyst is first blended with an aggregate which comprises 45.5 parts of coarse silica (⅛-¼″), 31.6 parts of intermediate size silica, and 22.9 parts 200 mesh silica flour. Thereafter, 12.0 parts of the resin composition of Example 1 is blended in until a uniform mixture is obtained. The aggregate system is poured into a waxed wooden form to form the desired shape. The working life of the aggregate system is about 40 minutes. Peak exotherm in 1.5-inch section was 98° F. The surface is tack-free in four hours. The wooden forms are removed after two days and the structure is judged to be fully cured in about four days.

The structure prepared above shows no signs of cracking after four months in an outdoor environment. Other cured samples of the polymer aggregate of this example exhibit excellent chemical resistance and a compression strength of 9,000 to 10,000 psi.

EXAMPLE 5

The procedure of Example 4 is repeated except that the catalyst which is utilized comprises 1.2 parts of the urea blocked phenol sulfonic acid.

EXAMPLE 6

A resin aggregate system is prepared in accordance with the procedure of Example 4 utilizing 45.5 parts of coarse silica aggregate, 31.6 parts of intermediate silica aggregate, 22.9 parts of silica flour, 12 parts of the resin composition of Example 2 and 1.0 parts of 67% toluene sulfonic acid solution in water. The resulting pourable aggregate has a working life of about 10 minutes, a peak exotherm of 140° F. in a 1.5-inch deep section, a tack-free surface in 30 minutes, and a full cure in 8 hours. The rapid reaction results in a somewhat lower density due to internal voids.

EXAMPLE 7

The procedure of Example 6 is repeated except that the 12 parts of the resin composition of Example 3 is used in place of the resin composition of Example 2.

The above examples illustrate the desirable properties obtained utilizing the acid-curable resin compositions of the present invention which comprises a mixture of a furan resin and a minor amount of epoxy resin. The resin aggregate systems of the present invention exhibit good working life, low peak exotherm, and, when cured, exhibit good compression strength, good chemical resistance and improved resistance to stress cracking. The resin-aggregate systems of the present invention are useful for preparing poured structures of all types such as curbing, pump platforms, chemical storage tanks, etc. Such structures prepared in accordance with the present invention are characterized by improved resistance to stress cracking.

I claim:

1. An acid-curable resin composition comprising a furan resin, from about 5 to about 45 parts by weight, per 100 parts of the furan resin, of an acid-curable epoxy resin, and an organic sulfonic acid or salt catalyst effective to initiate polymerization of the composition.

2. The composition of claim 1 wherein the acid-curable epoxy resin is a diglycidyl ether of a bis-phenol.

3. The composition of claim 1 wherein the acid-curable epoxy resin is an epoxidized novolac resin.

4. The composition of claim 1 wherein the amount of epoxy resin present in the composition is in the range of from about 10 to about 25 parts by weight per 100 parts by weight of furan resin.

5. The composition of claim 1 wherein the epoxy resin is a modified epoxy resin containing up to about 50% by weight of an acrylic or vinyl monomer, resorcinol, a urea-formaldehyde or phenol-formaldehyde thermosetting resin, urethane resin, or mixtures thereof.

6. An acid-curable resin composition comprising a mixture comprising
   (A) a major amount of a solid particulate material, and
   (B) a minor amount of a resin composition comprising a furan resin, from about 5 to about 45% by weight, based on the weight of the furan resin, of an acid-curable epoxy resin, and an organic sulfonic acid or salt catalyst effective to initiate polymerization.

7. The composition of claim 6 wherein the amount of epoxy resin in (b) is from about 10 to about 25 parts by weight per 100 parts by weight of the furan resin.

8. The composition of claim 6 wherein the epoxy resin is a diglycidyl ether of a bis-phenol or an epoxidized novolac resin.

9. The composition of claim 6 wherein the solid particulate material is sand.

10. The composition of claim 8 wherein the epoxy resin is a bis-phenol (A)-type epoxy resin.

11. A method of forming shaped, filled bodies comprising a mixture of furan resin and inorganic solid particulates which comprises the steps of
   (a) preparing a mixture comprising a major amount of inorganic solid particulates and a minor amount of an acid-curable resin composition comprising
      (i) a furan resin,
      (ii) from about 4 to about 45 parts by weight per 100 parts of the furan resin of an acid-curable epoxy resin, and
      (iii) an organic sulfonic acid or salt catalyst, effective to initiate polymerization.
   (b) forming said mixture into the desired shape, and
   (c) effecting a cure of the resin composition.

12. The method of claim 11 wherein the epoxy resin is a diglycidyl ether of bis-phenol (A) or an epoxidized novolac resin.

13. The method of claim 11 wherein the inorganic solid particulates comprises sand.

14. The method of claim 11 wherein the mixture in (a) comprises from about 0.2 to about 20% by weight of the acid-curable resin composition based on the weight of the inorganic solid particulates and from about 10 to about 25 parts by weight of the epoxy resin per 100 parts by weight of the furan resin.

15. The method of claim 11 wherein the acid catalyst comprises aliphatic or an aromatic sulfonic acid, a urea salt of an aromatic sulfonic acid, or a mixture thereof.

16. The method of claim 15 wherein the acid catalyst comprises a mixture of aromatic sulfonic acid selected from the group consisting of phenol sulfonic acid, benzene sulfonic acid, toluene sulfonic acid and xylene sulfonic acid.

17. The method of claim 15 wherein the catalyst comprises a mixture of sulfonic acid and the urea salt of a sulfonic acid in a weight ratio of acid to salt of from about 1:1 to about 1:10.

18. The product obtained by the method of claim 11.

19. The product obtained by the method of claim 17.

20. The method of claim 11 wherein the mixture prepared in step (a) comprises inorganic solid particulates and from about 0.2 to about 20% by weight of the acid-curable resin composition based on the weight of the inorganic solid particulates.

21. The composition of claim 1 prepared by the steps of (a) preparing a mixture of the furan resin and the acid-curable epoxy resin and thereafter (b) blending the acid catalyst into said mixture of furan resin and epoxy resin.

22. The acid-curable resin composition of claim 6 wherein (B) is prepared by the steps of (a) preparing a mixture of the furan resin and the epoxy resin, and thereafter (b) blending the acid catalyst into the mixture of furan and epoxy resins.

23. The method of claim 11 wherein the mixture of (a) is prepared by (1) preparing a mixture of the catalyst and the inorganic solid particulates (2) preparing a blend of the furan and epoxy resins, and (3) blending the mixture of (1) with the mixture of (2).

* * * * *